(12) United States Patent
Accapadi et al.

(10) Patent No.: US 10,831,539 B2
(45) Date of Patent: Nov. 10, 2020

(54) HARDWARE THREAD SWITCHING FOR SCHEDULING POLICY IN A PROCESSOR

(71) Applicant: International Business Machines Corporation, Armonk, NY (US)

(72) Inventors: Mathew Accapadi, Cedar Park, TX (US); Chad Collie, Springdale, AR (US); Grover C. Davidson, II, Leander, TX (US); Dirk Michel, Austin, TX (US); Bret R. Olszewski, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 77 days.

(21) Appl. No.: 16/356,348

(22) Filed: Mar. 18, 2019

(65) Prior Publication Data
US 2020/0301735 A1   Sep. 24, 2020

(51) Int. Cl.
*G06F 9/46* (2006.01)
*G06F 9/50* (2006.01)
(Continued)

(52) U.S. Cl.
CPC .......... *G06F 9/5011* (2013.01); *G06F 9/4837* (2013.01); *G06F 9/4881* (2013.01);
(Continued)

(58) Field of Classification Search
CPC .... G06F 9/5016; G06F 9/4881; G06F 9/5038; G06F 9/4812; G06F 9/4856;
(Continued)

(56) References Cited

U.S. PATENT DOCUMENTS 9,459,918 B2  10/2016  El-Moursy et al.
9,524,257 B2  12/2016  Bradbury et al.
(Continued)

FOREIGN PATENT DOCUMENTS

CN       105117184 A     12/2015

OTHER PUBLICATIONS

Anonymously, "Service-Level-Agreement-Aware Thread-Pool and Request Handling for Application Servers," IP.COM: Jan. 23, 2018. pp. 8.

(Continued)

*Primary Examiner* — Tuan A Vu
(74) *Attorney, Agent, or Firm* — Cantor Colburn LLP; David Quinn (57) ABSTRACT

Examples of techniques for hardware thread switching for scheduling policy in a processor are described herein. An aspect includes, based on receiving a request from a first software thread to dispatch to a first hardware thread, determining that the first hardware thread is occupied by a second software thread that has a higher priority than the first software thread. Another aspect includes issuing an interrupt to switch the second software thread from the first hardware thread to a second hardware thread. Another aspect includes, based on switching of the second software thread from the first hardware thread to the second hardware thread, dispatching the first software thread to the first hardware thread.

20 Claims, 4 Drawing Sheets

(51) Int. Cl.
*G06F 9/48* (2006.01)
*H04N 1/00* (2006.01)
*G06F 9/455* (2018.01)

(52) U.S. Cl.
CPC .......... *G06F 9/5038* (2013.01); *G06F 9/5044* (2013.01); *G06F 2009/4557* (2013.01); *H04N 1/00915* (2013.01)

(58) Field of Classification Search
CPC ...... G06F 9/45558; G06F 9/48; G06F 9/5011; G06F 9/5044; G06F 2009/4557; G06F 2009/5021; H04N 1/00915
See application file for complete search history.

(56) References Cited

U.S. PATENT DOCUMENTS

| | | | |
|---|---|---|---|
| 9,639,396 B2 | 5/2017 | Pho et al. | |
| 2009/0172315 A1* | 7/2009 | Iyer | G06F 9/5016 711/158 |
| 2009/0217276 A1* | 8/2009 | Brenner | G06F 9/4856 718/102 |
| 2012/0284720 A1* | 11/2012 | Cain, III | G06F 9/4881 718/101 |
| 2013/0124826 A1* | 5/2013 | Merchant | G06F 9/3851 712/205 |
| 2016/0275024 A1* | 9/2016 | Accapadi | G06F 9/4812 |
| 2017/0116039 A1* | 4/2017 | Mealey | G06F 9/45558 |
| 2017/0177393 A1* | 6/2017 | Gao | G06F 9/5038 |

OTHER PUBLICATIONS

Anonymously,"Establishing Deterministic Behavior of Processor Sub-System for Pulses on Level Sensitive Interrupt Lines," IP.COM: Sep. 28, 2011. pp. 8.

N. Honarmand, "Context Switching & CPU Scheduling," GOOGLE: 2017. pp. 90.

IBM, "Thread Scheduling Based on Thread Schedule," IP.COM: Dec. 13, 2007. pp. 11.

IBM., "Method to Improve Response Time for Threads Running in a Multi-threaded Environment," IP.COM: Oct. 28, 2009. pp. 3.

* cited by examiner

HARDWARE THREAD SWITCHING FOR SCHEDULING POLICY IN A PROCESSOR

BACKGROUND

The present techniques relate to processors. More specifically, the techniques relate to hardware thread switching for scheduling policy in processors.

There may be specific tasks (e.g., per-core heap garbage collection, or per-core data collection, such as performance counter collection) in a computer system that require a software thread to be dispatched to a specific core, or hardware thread, in a processor. Such a task may require access to information that is specific to the hardware thread. For example, a core may include a number of programmable registers that are accessible only while executing on the specific core. In another example, some kernel data structures may be non-serialized for concurrent access and manipulation by multiple cores or hardware threads, such as a mechanism used to clean up processor-specific memory heaps an operating system. Hardware counter statistic collections may use tools, such as a profiler tool, that require being run on a specific hardware thread. Heap garbage collection may also need to be performed on individually on each hardware thread, for example, garbage collection by an operating system-specific memory head garbage collector thread. Such core data collection or garbage collection threads may run at normal user priorities.

SUMMARY

According to an embodiment described herein, a system can include a processor to, based on receiving a request from a first software thread to dispatch to a first hardware thread, determine that the first hardware thread is occupied by a second software thread that has a higher priority than the first software thread. The processor can also issue an interrupt to switch the second software thread from the first hardware thread to a second hardware thread. The processor can also, based on switching of the second software thread from the first hardware thread to the second hardware thread, dispatch the first software thread to the first hardware thread.

According to another embodiment described herein, a method can include, based on receiving a request from a first software thread to dispatch to a first hardware thread, determining, by a processor, that the first hardware thread is occupied by a second software thread that has a higher priority than the first software thread. The method can also include issuing, by the processor, an interrupt to switch the second software thread from the first hardware thread to a second hardware thread. The method can also include, based on switching of the second software thread from the first hardware thread to the second hardware thread, dispatching, by the processor, the first software thread to the first hardware thread.

According to another embodiment described herein, a computer readable storage medium may include program instructions embodied therewith, the program instructions executable by a processor to cause the processor to perform a method including, based on receiving a request from a first software thread to dispatch to a first hardware thread, determining that the first hardware thread is occupied by a second software thread that has a higher priority than the first software thread. The method can also include issuing an interrupt to switch the second software thread from the first hardware thread to a second hardware thread. The method can also include, based on switching of the second software thread from the first hardware thread to the second hardware thread, dispatching the first software thread to the first hardware thread.

DETAILED DESCRIPTION

Embodiments of hardware thread switching for scheduling policy in a processor are provided, with exemplary embodiments being discussed below in detail. A software thread may request to be dispatched to a target hardware thread. However, there may be a higher priority software thread that is already executing on the target hardware thread. For example, a software product may have a real-time data acquisition thread running on the target hardware thread with a relatively high priority. If the high priority software thread does not give up the target hardware thread, the dispatching of the lower priority software thread on the target hardware thread may not complete. This may prevent the lower priority software thread from running.

A high priority software thread may be forced to context-switch out from the target hardware thread, and continue execution by dispatching on a different hardware thread, either on the same core or on another core in the processor. The switching of the high priority software thread may be performed based on a specific privilege level of the lower priority software thread; for example, based on an environment variable or specific security credentials that may be based on the task that is performed by the lower priority software thread. The environment variable may indicate to the scheduling policy that the kernel will allow the lower priority software thread to preempt a high priority thread. The environment variable may be set by, for example, an administrator of the computer system in some embodiments.

Embodiments of hardware thread switching for scheduling policy in a processor may be triggered by a lower priority software thread, such as a garbage collection or core data collection thread, that requests to be dispatched to an occupied target hardware thread in the processor. The request may include a switching request including an identifier of the target hardware thread. The priority of the software thread that currently occupies the target hardware thread is determined based on the request. If the target hardware thread is occupied by a lower or same priority software thread, as compared to the requesting software thread, the occupying software thread may give up the hardware thread at, for example, a next clock interrupt. If the occupying software thread is a high priority software thread, it is determined whether the lower priority software thread has appropriate privileges to force the high priority software thread to switch to another hardware thread.

In some embodiments, the high priority software thread may only be forced to switch to another hardware thread after executing on the target hardware thread for a predetermined period of time (e.g., a tunable number of clock ticks), so as to allow the high priority software thread to complete operations. Before forcing the high priority software thread to context-switch out from the target hardware thread, it may be determined whether there is an available hardware thread that is appropriate to execute the high priority software thread. In some embodiments, the high priority software thread may only be switched if there is an available hardware thread to execute the high priority software thread. In other embodiments, the lower priority software thread may preempt the high priority software thread based on the privilege level of the lower priority software thread. In some embodiments, if no hardware thread is currently running a software thread at a lower priority than the high priority software thread, a hardware thread that is running a lowest priority software thread in the processor may be selected as the new hardware thread for the high priority software thread, and the high priority thread may preempt the software thread on the selected new hardware thread.

The selection of the new hardware thread for the high priority software thread may be made based on the hardware topology of the processor in some embodiments. For example, if a processor has four hardware threads distributed across two cores, the high priority software thread may be switched to another hardware thread on the same core as the target hardware thread, so as to maintain access to local cache data. Further, in some embodiments, the lower priority thread may sequentially walk across all of the hardware threads or cores of the system, in order to, for example, perform garbage or core data collection across the entire processor system. Therefore, the selection of the new hardware thread may be made so as to reduce or prevent future interruptions for the high priority software thread. For example, a core may have four hardware threads, numbered from 0 to 3. A high priority software thread that is executing on hardware thread 0 may be switched to hardware thread 1 when hardware thread 0 is targeted by a lower priority garbage collection thread. When the garbage collection thread subsequently targets hardware thread 1, the high priority software thread may be switched back to hardware thread 0 so as to avoid a future interruption that would occur if the high priority software thread switched to hardware thread 2 or 3, which would subsequently be targeted by the garbage collection thread.

When the scheduling policy conditions are met, the system may send a processor-to-processor interrupt to force the high priority software thread to move to the new hardware thread. The switching of the high priority software thread may be implemented by a processor-to-processor software interrupt. The interrupt may be a multi-processor communication (MPC) interrupt in some embodiments.

Figure 1:
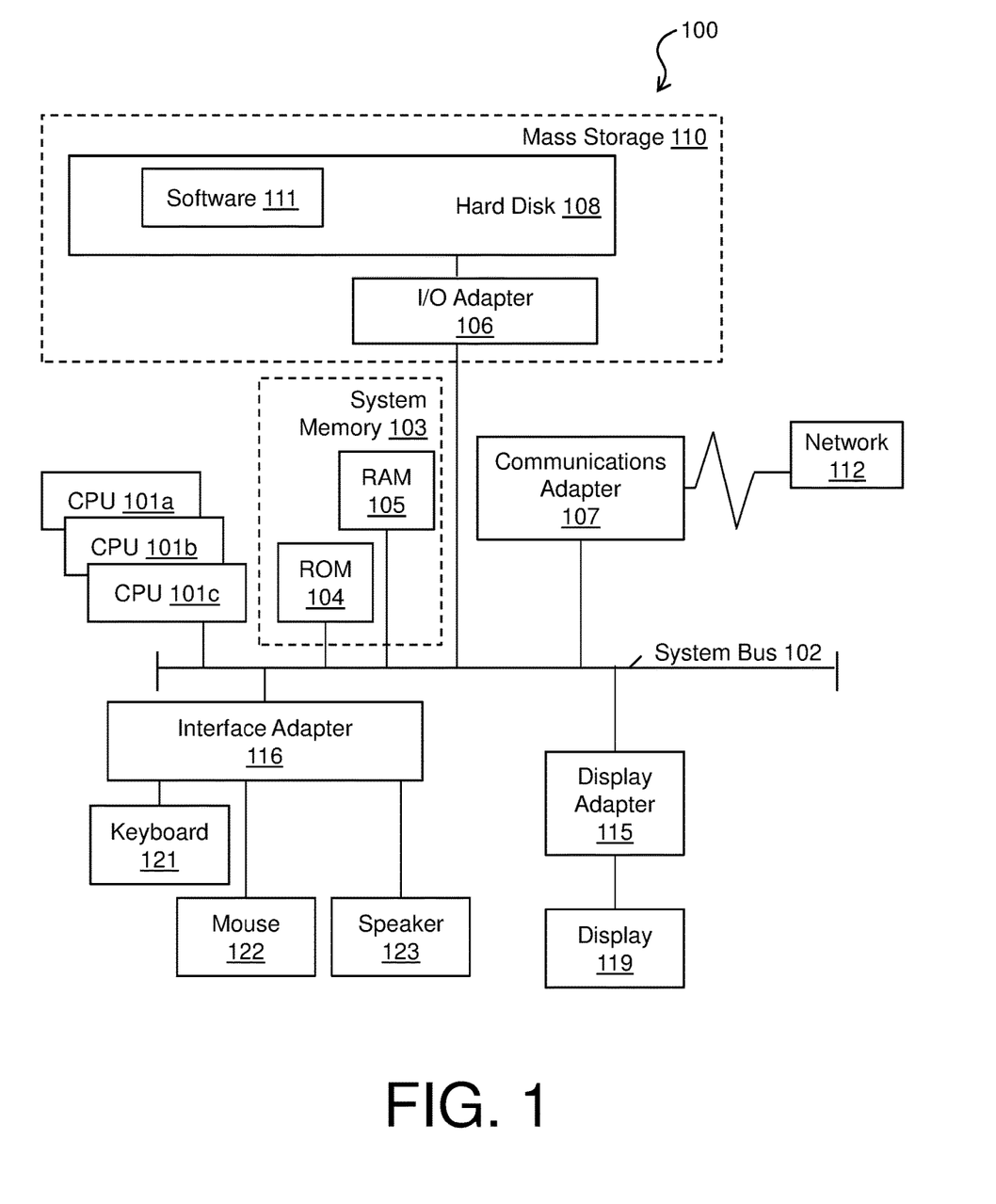
FIG. 1 is a block diagram of an example computer system for use in conjunction with hardware thread switching for scheduling policy in a processor.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computing system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
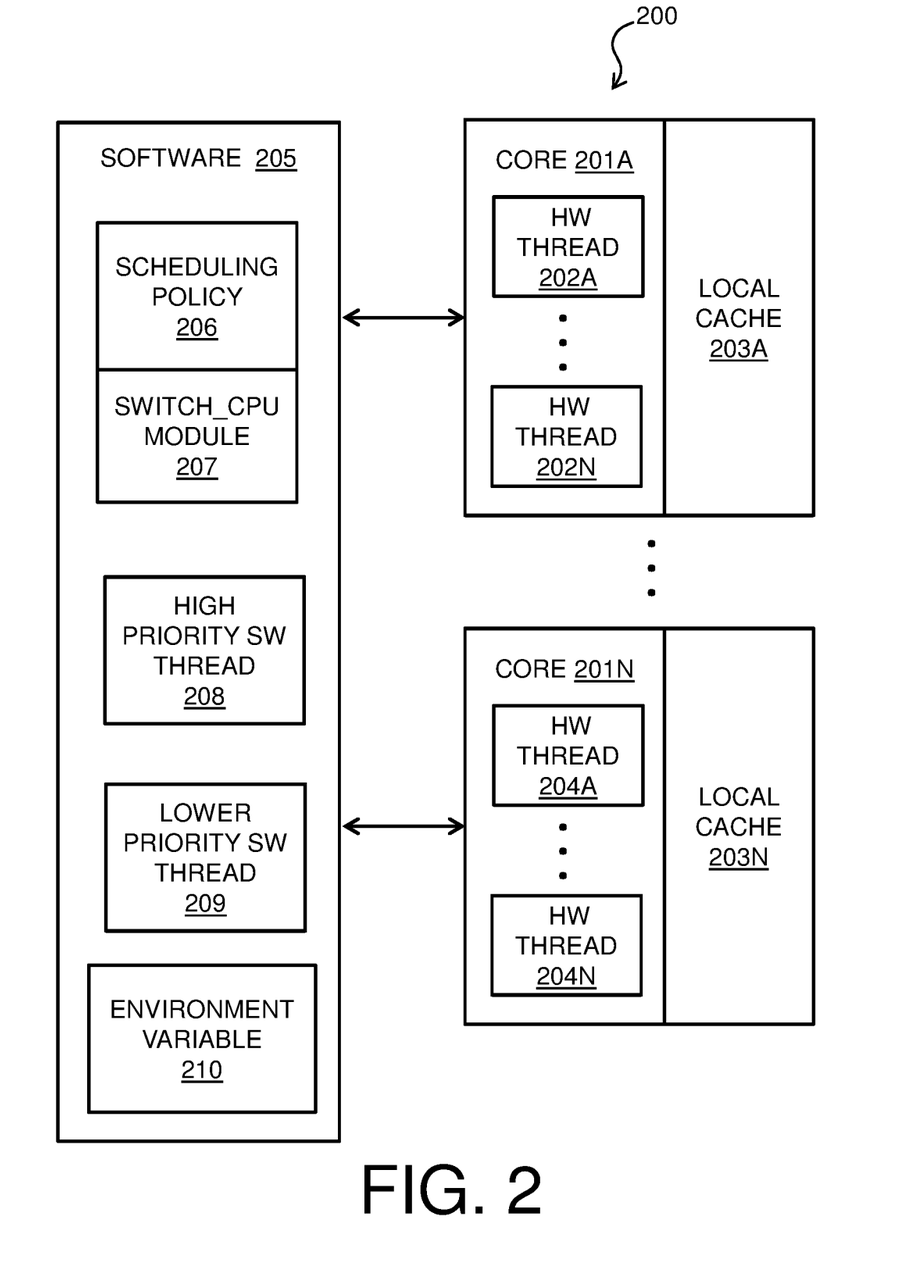
FIG. 2 is a block diagram of an example system for hardware thread switching for scheduling policy in a processor.

FIG. 2 is a block diagram of an example system 200 for hardware thread switching for scheduling policy in a processor. The system 200 can be implemented with any suitable computing device, such as the computer system 100 of FIG. 1. System 200 includes a plurality of CPU cores 201A-N, which may correspond to CPUs 101a-c in processor 101 of FIG. 1. Each of the CPU cores 201A-N may include a plurality of hardware threads, such as hardware threads 202A-N of core 201A, and hardware threads 204A-N of core 201N. Each of CPU cores 201A-N further includes an associated local cache 203A-N. Software 205 is executed by cores 201A-N. Software 205 may include an operating system and one or more applications in various embodiments.

Embodiments of software 205 may correspond to software 111 of FIG. 1. Software 205 includes a scheduling policy 206 and a switch_cpu module 207. Software 205 further includes a high priority software thread 208, and a lower priority software thread 209. A software thread, such as high priority software thread 208 or lower priority software thread 209, may be executed by any of hardware threads 202A-N or 204A-N. In some embodiments, lower priority software thread 209 may be a garbage collection thread or a core data collection thread. Software 205 may further include an environment variable 210. Environment variable 210 may be set by, for example, an administrator of system 200, and may indicate whether particular types of lower priority threads, such as garbage collection or core data collection threads, are allowed to preempt high priority threads. Operation of system 200 is discussed below with respect to FIG. 3 and FIG. 4.

It is to be understood that the block diagram of FIG. 2 is not intended to indicate that the system 200 is to include all of the components shown in FIG. 2. Rather, the system 200 can include any appropriate fewer or additional components not illustrated in FIG. 2 (e.g., cores, hardware threads, software threads, caches, software modules, additional memory components, embedded controllers, modules, additional network interfaces, etc.). Further, the embodiments described herein with respect to system 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
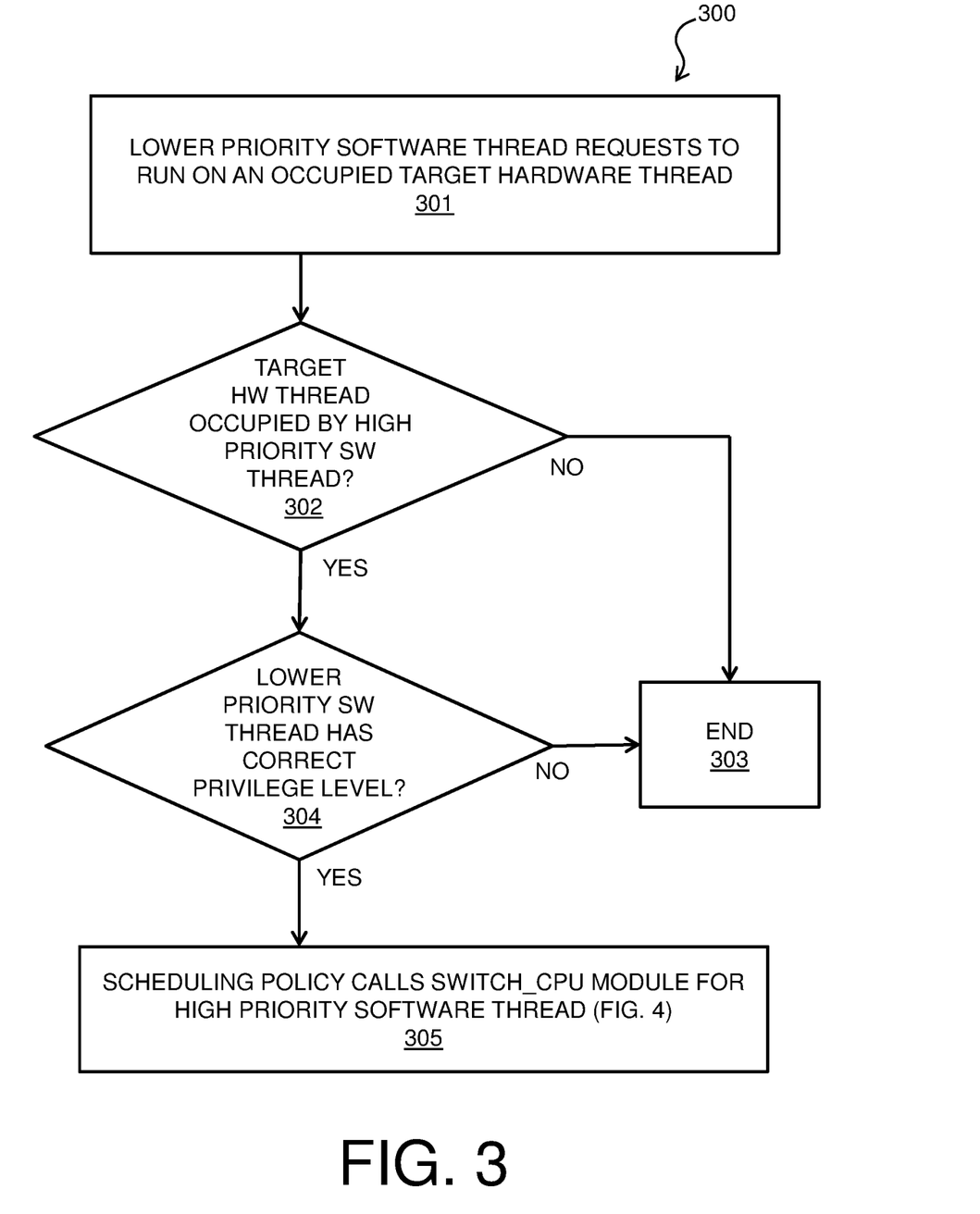
FIG. 3 is a process flow diagram of an example method for hardware thread switching for scheduling policy in a processor.

FIG. 3 is a process flow diagram of an example method 300 for hardware thread switching for scheduling policy in a processor. The method 300 can be implemented with any suitable computing device, such as the computer system 100 of FIG. 1, and may be implemented in system 200 of FIG. 2. In block 301, a lower priority software thread 209 makes a request to, for example, an operating system of a computer system such as computer system 100, to run on a target hardware thread (for example, hardware thread 202N) of a core 201A of a processor that is currently occupied by another software thread. In some embodiments, the lower priority software thread 209 may be, for example, a garbage collection thread or a core data collection thread that is run at a normal user priority. The request that is made by the lower priority software thread 209 in block 301 may include a switching request including an identifier of the target hardware thread 202N. In block 302, a priority of a software thread that currently occupies the target hardware thread 202N is determined based on the request of block 301. If the target hardware thread 202N is occupied by a lower or same priority software thread, as compared to the lower priority software thread 209, flow proceeds from block 302 to block 303, in which the occupying software thread may give up the hardware thread 202N at, for example, a next clock interrupt, and method 300 ends.

If it was determined in block 302 that the target hardware thread 202N is occupied by a high priority software thread 208, flow proceeds from block 302 to block 304. In block 304, it is determined, based on scheduling policy 206, whether the lower priority software thread 209 has a correct privilege level to invoke switch_cpu module 207. The determination of block 304 may be made based on environment variable 210. The environment variable 210 may indicate to the scheduling policy 206 that the kernel will allow the lower priority software thread 209 to preempt a high priority software thread 208 based on, for example, a type of task that is performed by the lower priority software thread 209. The environment variable 210 may be set by, for example, an administrator of the computer system in some embodiments.

If it is determined in block 304 that the lower priority software thread 209 does not have the correct privileges to invoke switch_cpu module 207, flow proceeds from block 304 to block 303, and method 300 ends. If it is determined in block 304 that the lower priority software thread 209 does have correct privileges to invoke switch_cpu module 207, flow proceeds from block 304 to block 305. In block 305, the scheduling policy 206 calls the switch_cpu module 207 for the lower priority software thread 209. Operation of the switch_cpu module 207 is discussed below with respect to FIG. 4. Method 300 of FIG. 3 may be implemented in an operating system of a computer system such as computer system 100, and method 300 may be triggered whenever a software thread issues a request to dispatch to a hardware thread that is currently occupied by another software thread.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
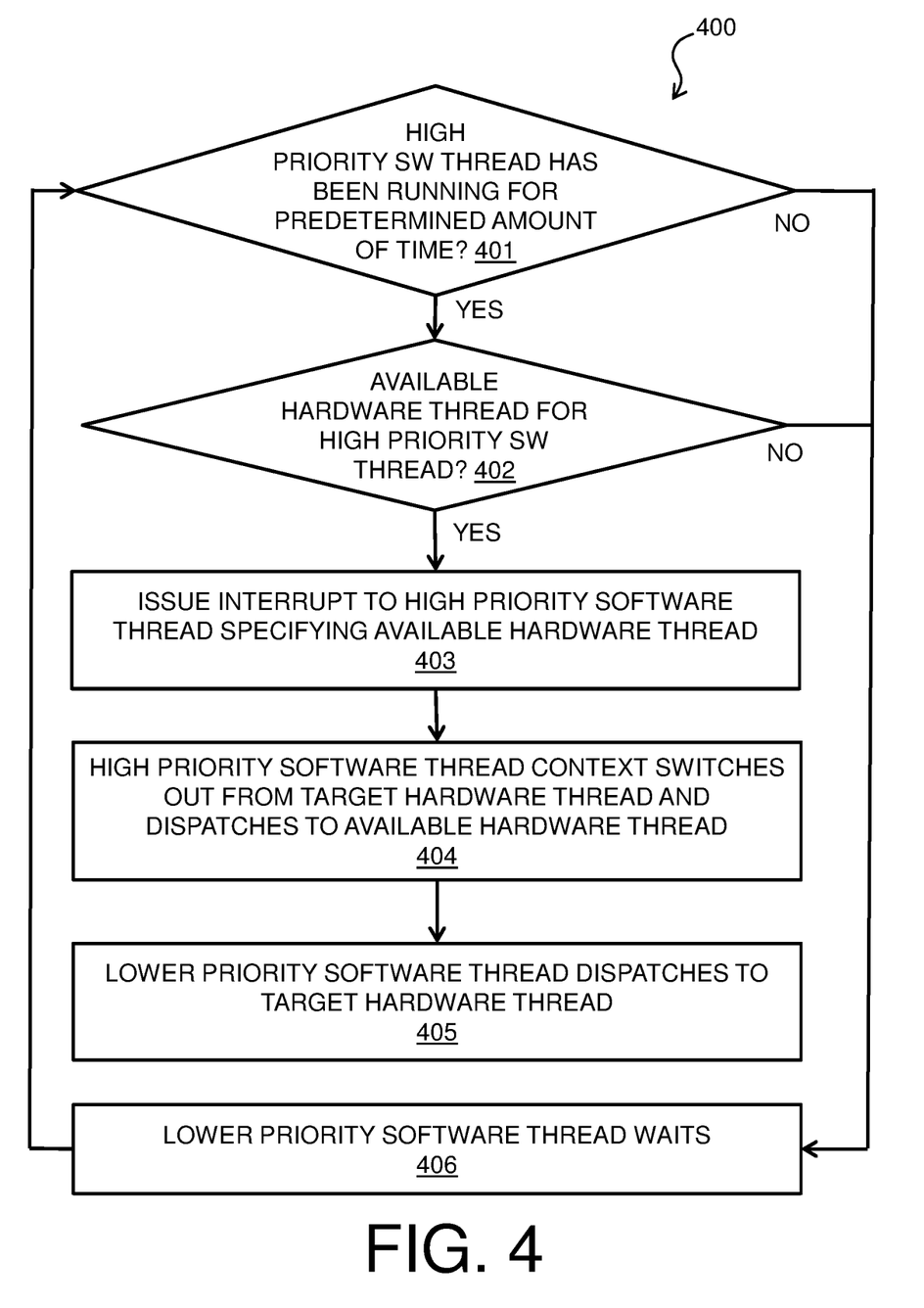
FIG. 4 is a process flow diagram of another example method for hardware thread switching for scheduling policy in a processor.

FIG. 4 is a process flow diagram of an example method 400 for hardware thread switching for scheduling policy in a processor. The method 400 can be implemented with any suitable computing device, such as the computer system 100 of FIG. 1, and may be implemented in switch_cpu module 207 in system 200 of FIG. 2. In block 401, it is determined whether the high priority software thread 208 has been running on the target hardware thread 202N for a predetermined amount of time. In some embodiments, the predetermined amount of time may be a number of clock ticks. In some embodiments, the predetermined amount of time may be set by an administrator of the system 200. If it is determined in block 401 that the high priority software thread 208 has not been running on the target hardware thread 202N for the predetermined amount of time, flow proceeds from block 401 to block 406, in which the lower priority software thread 209 waits. Flow proceeds back to block 401 from block 406. When it is determined in block 401 that the high priority software thread 208 has been running on the target hardware thread 202N for the predetermined amount of time, flow proceeds from block 401 to block 402.

In block 402, it is determined whether there is an available hardware thread in the system 200 for the high priority software thread 208. In some embodiments of block 402, the high priority software thread 208 may only be switched to another hardware thread if there is an available hardware thread that is determined to be appropriate to execute the high priority software thread. In other embodiments, the lower priority software thread 209 may preempt the high priority software thread 208 based on the privilege level of the lower priority software thread 209, and the high priority software thread 208 may be context-switched out from the target hardware thread 202N to wait for an appropriate hardware thread to resume execution while the lower priority software thread 209 dispatches on the target hardware thread 202N. In some embodiments, if no hardware thread in the system 200 is currently running a software thread at a lower priority than the high priority software thread 208, a hardware thread that is running a lowest priority software thread in the processor may be selected as the new hardware thread for the high priority software thread 208, and the high priority software thread 208 may preempt the software thread on the selected new hardware thread.

The selection of the new hardware thread in block 402 may be made based on the hardware topology of the system 200 in some embodiments. For example, if a processor has four hardware threads distributed across two cores, the high priority software thread 208 may be switched to another hardware thread (e.g., hardware thread 202A) located on the same core 201A as the target hardware thread 202N, so as to maintain access to data in the local cache 203A. Further, in some embodiments, the lower priority software thread 209 may sequentially walk across all of the hardware threads or cores of the system 200, in order to, for example, perform garbage collection or core data collection across the entire processor system. Therefore, the selection of the new hardware thread may be made so as to reduce or prevent future interruptions for the high priority software thread 208. For example, a core may have four hardware threads, numbered from 0 to 3. A high priority software thread 208 that is executing on hardware thread 0 may be switched to hardware thread 1 when hardware thread 0 is targeted by a lower priority software thread 209 that is performing, for example, garbage collection across all the hardware threads of the system 200. When the lower priority software thread 209 subsequently targets hardware thread 1, the high priority software thread 208 may be switched back to hardware thread 0 so as to avoid a future interruption that would occur if the high priority software thread switched to hardware thread 2 or 3, which would subsequently be targeted by the lower priority software thread 209 during the garbage collection process.

If it is determined in block 402 that there is no available hardware thread in the system 200 for the high priority software thread 208, flow proceeds from block 401 to block 406, in which the lower priority software thread 209 waits. Flow then proceeds back to block 402 from block 406 via block 401. When it is determined in block 402 that there is an available hardware thread (for example, hardware thread 202A) in the system 200 for the high priority software thread 208, flow proceeds from block 402 to block 403.

In block 403, the switch_cpu module 207 issues an interrupt to the high priority software thread 208. The interrupt may specify the available hardware thread 202A that was determined in block 402. The interrupt may be a processor-to-processor interrupt to force the high priority software thread 208 to move to the new hardware thread 202A. The interrupt may be a multi-processor communication (MPC) interrupt in some embodiments. In block 404, based on the interrupt that was issued in block 403, the high priority software thread 208 context-switches out from the target hardware thread 202N and dispatches to the available hardware thread 202A. In block 405, the lower priority software thread 209 dispatches to the target hardware thread 202N. The lower priority software thread 209 then executes on the target hardware thread 202N.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

The present techniques may be a system, a method or an apparatus. The flowchart and block diagrams in the Figures illustrate the architecture, functionality, and operation of possible implementations of systems, methods, and apparatus according to various embodiments of the present techniques. In this regard, each block in the flowchart or block diagrams may represent a module, segment, or portion of logic for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor configured to:
    based on receiving a request from a first software thread to dispatch to a first hardware thread:
        determine that the first hardware thread is occupied by a second software thread that has a higher priority than the first software thread;
        issue an interrupt to switch the second software thread from the first hardware thread to a second hardware thread; and
        based on switching of the second software thread from the first hardware thread to the second hardware thread, dispatch the first software thread to the first hardware thread.

2. The system of claim 1, wherein the interrupt is issued based on the second software thread having been executing on the first hardware thread for a predetermined amount of time.

3. The system of claim 1, wherein the interrupt is issued based on a privilege level of the first software thread.

4. The system of claim 3, wherein the privilege level of the first software thread is determined based on an environment variable.

5. The system of claim 1, the processor configured to select the second hardware thread such that the first hardware thread and the second hardware thread are located on a same core of the processor.

6. The system of claim 5, the processor configured to select the second hardware thread such that the second hardware thread has a lower thread number in the core than the first hardware thread.

7. The system of claim 1, wherein the first software thread comprises one of a garbage collection thread and a core data collection thread.

8. A computer-implemented method, comprising:
    based on receiving a request from a first software thread to dispatch to a first hardware thread of a processor:
        determining, by the processor, that the first hardware thread is occupied by a second software thread that has a higher priority than the first software thread;
        issuing, by the processor, an interrupt to switch the second software thread from the first hardware thread to a second hardware thread; and
        based on switching of the second software thread from the first hardware thread to the second hardware thread, dispatching, by the processor, the first software thread to the first hardware thread.

9. The computer-implemented method of claim 8, wherein the interrupt is issued based on the second software thread having been executing on the first hardware thread for a predetermined amount of time.

10. The computer-implemented method of claim 8, wherein the interrupt is issued based on a privilege level of the first software thread.

11. The computer-implemented method of claim 10, wherein the privilege level of the first software thread is determined based on an environment variable.

12. The computer-implemented method of claim 8, the method comprising:
    selecting the second hardware thread such that the first hardware thread and the second hardware thread are located on a same core of the processor.

13. The computer-implemented method of claim 12, the method comprising:
    selecting the second hardware thread such that the second hardware thread has a lower thread number in the core than the first hardware thread.

14. The computer-implemented method of claim 8, wherein the first software thread comprises one of a garbage collection thread and a core data collection thread.

15. A computer program product comprising:
    a computer readable storage medium having program instructions embodied therewith, the program instructions executable by a processor to cause the processor to perform a method comprising:
        based on receiving a request from a first software thread to dispatch to a first hardware thread:
        determining that the first hardware thread is occupied by a second software thread that has a higher priority than the first software thread;
        issuing an interrupt to switch the second software thread from the first hardware thread to a second hardware thread; and
        based on switching of the second software thread from the first hardware thread to the second hardware thread, dispatching the first software thread to the first hardware thread.

16. The computer program product of claim 15, wherein the interrupt is issued based on the second software thread having been executing on the first hardware thread for a predetermined amount of time.

17. The computer program product of claim 15, wherein the interrupt is issued based on a privilege level of the first software thread.

18. The computer program product of claim 17, wherein the privilege level of the first software thread is determined based on an environment variable.

19. The computer program product of claim 15, the method comprising:
    selecting the second hardware thread such that the first hardware thread and the second hardware thread are located on a same core of the processor.

20. The computer program product of claim 19, the method comprising:
    selecting the second hardware thread such that the second hardware thread has a lower thread number in the core than the first hardware thread.

* * * * *